June 10, 1930.  J. HARRIS  1,762,226

MAXIMUM DEMAND METER

Filed Nov. 23, 1928

INVENTOR
Jesse Harris

Patented June 10, 1930

1,762,226

UNITED STATES PATENT OFFICE

JESSE HARRIS, OF LA FAYETTE, INDIANA

MAXIMUM-DEMAND METER

Application filed November 23, 1928. Serial No. 321,304.

My invention relates to electricity metering systems and to indicating and resetting devices which may be so associated with the watthour meters employed in such systems as to constitute such meters maximum demand meters of the block interval type.

In carrying out my invention, I employ an electric motor having current and pressure windings connected with a lighting or other consumption circuit and cooperating to produce motion proportionally to the wattage. I also employ a constant speed motor which is preferably also an electric motor subject to the pressure of the system.

The first motor may constitute the motor element of the ordinary watthour meter and both motors operate in conjunction with the indicating and resetting device of my invention to constitute the watthour meter a maximum demand meter also. The demand mechanism is combined with the regular watthour register of the meter, the kilo-watthour energy being recorded on four dials as usual and the demand in kilowatts on a scale with a long pointer. The long pointer for the demand scale is advanced by a small pointer, and, being of the friction type, remains at the position of maximum travel of the small pointer until reset to zero after reading. The demand pointers may be reset to zero without unsealing the cover of the meter, the resetting device being provided with means for separate sealing. The short pointer, in addition to being the driving pointer, also serves to show what is going on during any demand interval. The time interval is controlled by a small synchronous motor. Because it is a synchronous motor, variations in voltage, and temperature are eliminated, and the accuracy of the time interval is dependent only on the frequency of the circuit on which it is operating. Since the frequency of modern distribution systems is generally quite constant, accurate time intervals are assured.

During the demand interval, the motor is caused to store up energy in a spring which is released at the end of each interval, and, through a special mechanism, returns the driving pointer of the demand mechanism to zero, leaving the large demand pointer at its position of maximum travel in any interval, until reset at the end of the billing period. The resetting of the mechanism by the timing motor is practically instantaneous, so that no time is lost between demand intervals. The link between the watthour meter train and the reset mechanism is a friction clutch.

Figure 1:
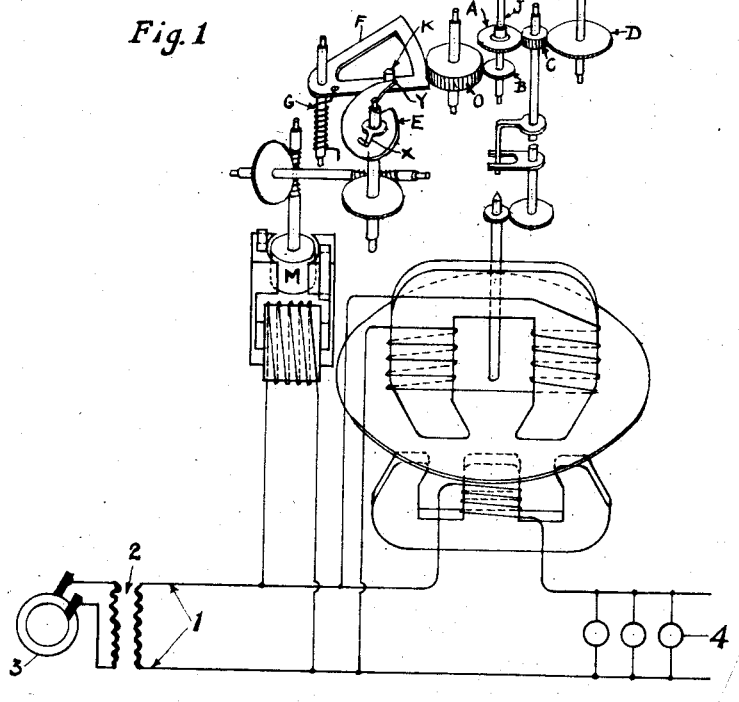
Figure 3:
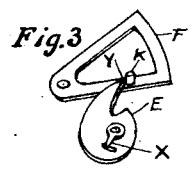
Figure 2:
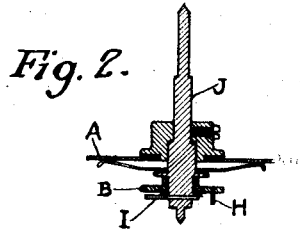
Figure 4:
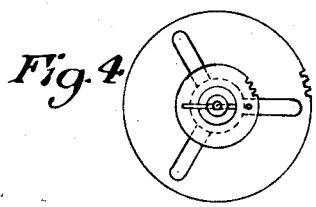

The invention will be more fully explained in connection with the accompanying drawings in which Fig. 1 is a schematic diagram showing the principle of operation; Fig. 2 is a longitudinal sectional view through a portion of the mechanism; Fig. 3 is a perspective view illustrating two cooperating members; and Fig. 4 is a bottom view of the structure illustrated in Fig. 2.

The consumption circuit 1, illustrated, is supplied with alternating current by means of a transformer 2 whose primary is in circuit with an alternating generator 3. The circuit is illustrated as supply incandescent lamps 4, though it is understood any character of load may be furnished with current by the circuit. It is also to be understood that the invention is not to be limited to an alternating current system of distribution.

The watthour meter moving element drives the watthour dials through the gears C and D direct and the demand pointer through the clutch gear A. Details of the clutch are shown in Fig. 2.

The demand pointer is reset to zero at the end of each demand interval through the agency of a synchronous timing motor shown at M. The timing motor runs continuously at synchronous speed and through a proper gear reduction drives the cam E so that it makes one complete revolution each demand interval. This cam moves a gear sector F against a spring G. The gear sector F is continuously in mesh with B, the other gear wheel of the friction clutch, through suitable gearing such as O. The pin H (shown in Fig. 2) is fixed in gear B while the pin I is fixed in the shaft J carrying the demand driving pointer. Gear B is free to move on shaft J until the pins come into action. As the watthour meter advances the demand pointer through gears C and A, A drives the shaft J through a friction clutch as shown. At the end of the demand interval the roller K drops off the tip of the cam E and the spring G forces the sector gear F back. This in turn reverses the motion of the gear B. When B is reversed the pin H picks up the pin I in the shaft J and slips J through the friction clutch returning the demand driving pointer to its zero position.

Fig. 3 is a diagram showing the position of cam E and drive arm X at the moment of release. The drive arm X and the slot in the cam makes up for the angle and time lost when the roller K drops from the high to the low point of the cam; this construction also prevents the roller K from cramping at the point of release of the cam E.

The cam E is mounted loosely upon its shaft allowing a limited motion forward and back as controlled by the drive arm X and the slot in the cam.

This allows the tip Y of the cam E to move forward under the action of spring G, when its travel due to the motor M has carried it past half the diameter of the roller K, as shown in Fig. 3, and to the start of the reset position, thus allowing the reset mechanism to operate without cramping between the roller K and cam E. Due to pressure of the roller K under the action of spring G, when released and assuming its lower position, the cam E is returned to its driven position in respect to the driving arm X and allows the motor M to carry the reset pin H instantly out of interference with the recording mechanism.

It is obvious that changes can be made without departing from the spirit and scope thereof as set forth in the appended claim.

I claim as my invention:

A maximum demand electricity meter including a rotating electric motor having current and pressure windings to cause it to turn proportionately to the wattage; a constant speed motor; an arm driven by the second motor at a constant speed; a cam driven by the arm, said cam and arm having engaging formations permitting limited relative movement of the cam and arm; a gear sector engageable by said cam to be thereby turned in one direction and in escaping relation with the cam when turned; means for turning the gear sector in the reverse direction while it is escaping the cam, the cam being movable with relation to the aforesaid arm while the sector is escaping the cam; a pointer driving member driven by the first motor; a clutch through which the first motor drives said driving member and permitting reverse or restoring movement of this member; and gearing operable by said gear sector and operated by said sector, when this sector is reversed by the aforesaid sector turning means, this gearing then serving to restore the pointer driving member.

In witness whereof, I hereunto subscribe my name.

JESSE HARRIS.